(12) United States Patent
Araki

(10) Patent No.: US 12,091,589 B2
(45) Date of Patent: Sep. 17, 2024

(54) SELF-ADHESIVE SILICONE GEL COMPOSITION AND SILICONE GEL COMPRISING CURED PRODUCT THEREOF

(71) Applicant: SHIN-ETSU CHEMICAL CO., LTD., Tokyo (JP)

(72) Inventor: Tadashi Araki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 553 days.

(21) Appl. No.: 17/600,311

(22) PCT Filed: Mar. 26, 2020

(86) PCT No.: PCT/JP2020/013510
§ 371 (c)(1),
(2) Date: Sep. 30, 2021

(87) PCT Pub. No.: WO2020/203597
PCT Pub. Date: Oct. 8, 2020

(65) Prior Publication Data
US 2022/0220351 A1    Jul. 14, 2022

(30) Foreign Application Priority Data
Apr. 1, 2019 (JP) .................................. 2019-069645

(51) Int. Cl.
C09J 183/04    (2006.01)
(52) U.S. Cl.
CPC .................................. *C09J 183/04* (2013.01)
(58) Field of Classification Search
CPC ...................................................... C09J 183/04
USPC ........................................................ 524/188
See application file for complete search history.

(56) References Cited

U.S. PATENT DOCUMENTS

| | | | |
|---|---|---|---|
| 4,814,408 A | 3/1989 | Itoh et al. | |
| 5,384,384 A | 1/1995 | Inoue et al. | |
| 5,534,609 A | 7/1996 | Lewis et al. | |
| 6,169,155 B1 | 1/2001 | Alvarez et al. | |
| 10,662,331 B2 | 5/2020 | Araki | |
| 2003/0181624 A1* | 9/2003 | Kashiwagi | C08L 83/04 528/15 |
| 2009/0105441 A1 | 4/2009 | Ushio et al. | |
| 2018/0201786 A1* | 7/2018 | Araki | C08L 83/04 |

FOREIGN PATENT DOCUMENTS

| | | |
|---|---|---|
| JP | 63-199276 A | 8/1988 |
| JP | 4-78655 B2 | 12/1992 |
| JP | 5-67673 A | 9/1993 |
| JP | 7-98902 B2 | 10/1995 |
| JP | 2741460 B2 | 4/1998 |
| JP | 2000-309711 A | 11/2000 |
| JP | 2002-338833 A | 11/2002 |
| JP | 2003-213134 A | 7/2003 |
| JP | 2004-323764 A | 11/2004 |
| JP | 2005-350582 A | 12/2005 |
| JP | 2008-291148 A | 12/2008 |
| JP | 4960620 B2 | 6/2012 |
| JP | 5025917 B2 | 9/2012 |
| JP | 5179302 B2 | 4/2013 |
| JP | 5587148 B2 | 9/2014 |
| JP | 5602385 B2 | 10/2014 |
| JP | 5631964 B2 | 11/2014 |
| JP | 2015-7203 A | 1/2015 |
| JP | 2017-25232 A | 2/2017 |
| JP | 2018-53015 A | 4/2018 |
| JP | 2018053015 A * | 4/2018 |
| JP | 2018-119021 A | 8/2018 |
| JP | 6409704 B2 | 10/2018 |
| JP | 2019-1885 A | 1/2019 |
| JP | 6465219 B2 | 2/2019 |
| WO | WO 2015/118992 A1 | 8/2015 |

OTHER PUBLICATIONS

International Search Report, issued in PCT/JP2020/013510, PCT/ISA/210, dated Jun. 16, 2020.
Written Opinion of the International Searching Authority, issued in PCT/JP2020/013510, PCT/ISA/237, dated Jun. 16, 2020.

* cited by examiner

*Primary Examiner* — Kelechi C Egwim
(74) *Attorney, Agent, or Firm* — Birch, Stewart, Kolasch & Birch, LLP

(57) ABSTRACT

This addition reaction curing-type self-adhesive silicone gel composition has a predetermined amount of a specific non-functional organopolysiloxane added thereto, has predetermined amounts of a specific carboxylic acid metal salt and a partial hydrolysis-condensation product of a specific hydrolysable silane added thereto, and can be used to provide a silicone gel cured product that has sufficient adhesiveness to a metal substrate made of copper, aluminum, or the like, that can prevent generation of voids or detachment after adhesion even under high temperature conditions, and that has a high dielectric strength.

4 Claims, 1 Drawing Sheet

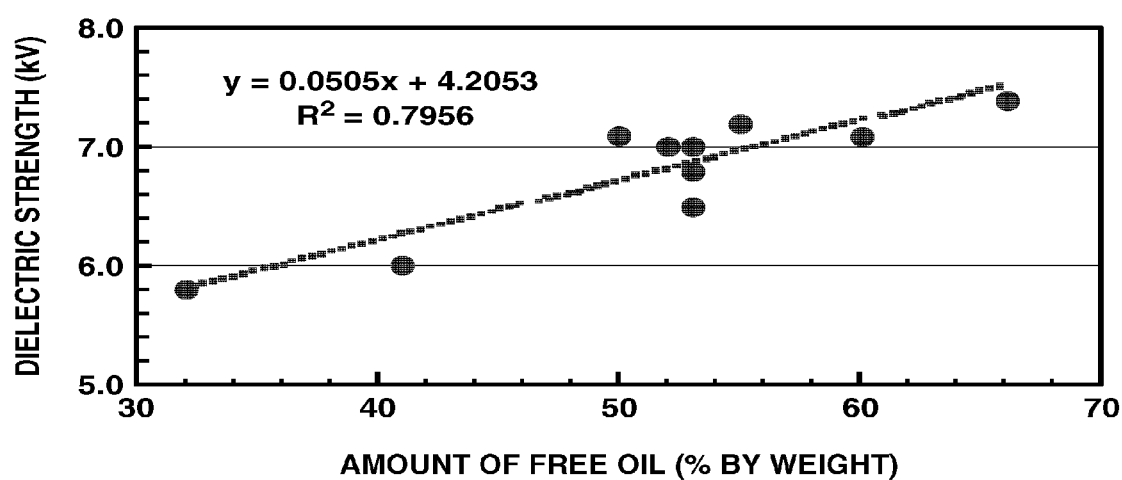

SELF-ADHESIVE SILICONE GEL COMPOSITION AND SILICONE GEL COMPRISING CURED PRODUCT THEREOF

TECHNICAL FIELD

This invention relates to a self-adhesive silicone gel composition that cures to give a silicone gel cured product having excellent heat resistance and exhibiting an excellent adhesive property to various substrates even under a high temperature condition, and particularly relates to a silicone gel composition that gives a silicone gel cured product having a good adhesive property to a metal substrate such as a copper or aluminum substrate, being capable of suppressing peeling from the substrate and generation of a void after adhesion, and having excellent dielectric strength under a high temperature condition, and relates to a cured product thereof (silicone gel).

BACKGROUND ART

Silicone gel compositions contain an organohydrogenpolysiloxane having a hydrogen atom bonded to a silicon atom (that is, an SiH group), an organopolysiloxane having an alkenyl group such as a vinyl group bonded to a silicon atom, and a platinum group metal-based catalyst, and are prepared as an addition reaction curable organopolysiloxane composition in which a cured product is obtained by an addition reaction of the hydrogen atom bonded to the silicon atom to the alkenyl group. This silicone gel composition is heated and cured to obtain a silicone gel cured product. The silicone gel cured product is excellent in heat resistance, weather resistance, oil resistance, cold resistance, electrical insulation, and the like, and has a low elastic modulus and a low stress. Therefore, the silicone gel cured product is used for protecting electronic components such as in-vehicle electronic components and consumer electronic components. The low elastic modulus and the low stress as characteristics of the silicone gel cured product are not found in other elastomer products. From the demand for high reliability of in-vehicle electronic components and consumer electronic components, there has been recently an increasing demand for a silicone gel material used for sealing to obtain a silicone gel having very high heat resistance to withstand a temperature higher than 150° C., a high adhesive property to a substrate such as an engineering plastic or copper substrate for electronic components, and high dielectric strength in an electronic substrate.

First, investigation of researches on improvement of heat resistance shows that adding a filler such as carbon or iron oxide is effective for general silicone rubber. However, if the method of adding a filler is applied to a silicone gel material that is to have low viscosity and to have transparency, disadvantages occur such as deterioration of the transparency, sedimentation of the filler, and deterioration of the workability due to increase in the viscosity, and therefore such a method cannot be easily applied. Under such a background, there are methods for imparting heat resistance in which a metal salt of cerium is used as described in JP-A 2008-291148 (Patent Document 1), in which a carboxylate of iron is used as described in JP-A 2015-007203 (Patent Document 2), and in which a carboxylate of nickel or niobium is used as described in Japanese Patent No. 6409704 (Patent Document 3). However, such methods have a disadvantage such that if the amount of the free oil in the silicone gel is large, softening degradation of the silicone gel are so remarkable in resisting heat that the silicone gel is softened due to its own weight without retaining the original shape. Therefore, an electronic component in which the silicone gel is used cannot be vertically placed for use, and a method for solving these problems has been awaited.

Next, with regard to researches on improvement of heat resistance, JP-B H07-098902 (Patent Document 4), Japanese Patent No. 5025917 (Patent Document 5), Japanese Patent No. 5179302 (Patent Document 6), Japanese Patent No. 5587148 (Patent Document 7), Japanese Patent No. 5602385 (Patent Document 8), Japanese Patent No. 5631964 (Patent Document 9), JP-A 2002-338833 (Patent Document 10), and the like disclose improvement of the adhesive property by using an adhesive component that exhibits a high adhesive property, that is, a silane coupling agent having a hydrolyzable group such as a methoxy group or an ethoxy group and a functional group such as an epoxy group, an isocyanate group, or an isocyanuric group in the molecule. However, if a substance having a hydrolyzable group as described above is added, a by-product of hydrolysis with moisture, that is, an alcohol such as methanol or ethanol is gasified by heat released from an electronic material, and as a result, there arises a problem of peeling from the interface with a substrate, or a problem of generation of an empty space called a void. Therefore, the dielectric strength deteriorates, and the catalytic ability of the platinum catalyst used as a curing catalyst deteriorates according to the silane coupling agent to be used, so that there has been also a problem of change in the flexibility over time or a problem of being uncured. JP-A S63-199276 (Patent Document 11), JP-B H04-078655 (Patent Document 12), JP-B H05-067673 (Patent Document 13), and Japanese Patent No. 2741460 (Patent Document 14) disclose a technique for improving an adhesive property by adding an organic peroxide, but also in these techniques, there arises a problem of peeling or a void due to oxygen generated as a by-product, resulting in deterioration of the dielectric strength.

JP-A 2000-309711 (Patent Document 15), JP-A 2005-350582 (Patent Document 16), and Japanese Patent No. 4960620 (Patent Document 17) disclose a technique for improving an adhesive property by changing the structure of the organopolysiloxane to be used, the structure of a hydrosilyl group (Si—H) or the like, or the like, but in these techniques, although the adhesiveness with a substrate is certainly enhanced, adhesion is not achieved, and therefore there has been a problem of deterioration of the adhesiveness due to long-term use.

In recent years, Japanese Patent No. 6465219 (Patent Document 18) discloses a method in which an isocyanate-containing aliphatic organic substance is used, JP-A 2018-119021 (Patent Document 19) discloses a method in which a tetraorganoxytitanium having a specific hydrolyzable group is used, and JP-A 2019-001885 (Patent Document 20) discloses a method in which ketene silyl acetal is used. However, although the adhesiveness is improved by adding such a substance, good adhesiveness cannot be obtained if the amount of the free oil is large.

With regard to the dielectric strength, it has been known that the dielectric strength deteriorates due to generation of a void as described above, but at present, a technique for improving the dielectric strength is not known.

PRIOR ART DOCUMENTS

Patent Documents

Patent Document 1: JP-A 2008-291148
Patent Document 2: JP-A 2015-007203

Patent Document 3: JP No. 6409704
Patent Document 4: JP-B H07-098902
Patent Document 5: JP No. 5025917
Patent Document 6: JP No. 5179302
Patent Document 7: JP No. 5587148
Patent Document 8: JP No. 5602385
Patent Document 9: JP No. 5631964
Patent Document 10: JP-A 2002-338833
Patent Document 11: JP-A S63-199276
Patent Document 12: JP-B H04-078655
Patent Document 13: JP-B H05-067673
Patent Document 14: JP No. 2741460
Patent Document 15: JP-A 2000-309711
Patent Document 16: JP-A 2005-350582
Patent Document 17: JP No. 4960620
Patent Document 18: JP No. 6465219
Patent Document 19: JP-A 2018-119021
Patent Document 20: JP-A 2019-001885

SUMMARY OF INVENTION

Technical Problem

The invention has been made to solve such problems, and an object of the invention is to provide a self-adhesive silicone gel composition capable of giving a silicone gel cured product that is excellent in heat resistance at high temperature, has a sufficient adhesive property even to a metal substrate including copper (Cu), aluminum (Al), or the like existing as a part of an electronic substrate, and is capable of suppressing occurrence of peeling and a void after adhesion and has high dielectric strength even under a high temperature condition, and to provide a cured product of the self-adhesive silicone gel composition (silicone gel).

Solution to Problem

Making extensive investigations to attain the above object, the inventor has found that addition of a predetermined amount of a specific non-functional organopolysiloxane as a free oil to an addition reaction curable silicone gel composition leads to improvement in the dielectric strength when the silicone gel cured product adheres (is in adhesion) to a substrate, addition of a predetermined amount of a specific metal carboxylate to the silicone gel cured product leads to impartation of heat resistance to the silicone gel cured product, and addition of a predetermined amount of a partial hydrolytic condensate of a specific hydrolyzable silane leads to remarkable improvement in the adhesiveness (adhesive property) to a substrate under a high temperature condition although the adhesiveness is impaired by addition of the free oil, and combination use of the metal carboxylate and the partial hydrolytic condensate of a hydrolyzable silane leads to dramatical improvement in the shape retaining property at high temperature although the shape retaining property is impaired by addition of the free oil, and the present inventor has completed the invention.

Therefore, the invention provides a self-adhesive silicone gel composition and a cured product thereof (silicone gel) described below.

1.
A self-adhesive silicone gel composition including:
(A) 100 parts by weight of an organopolysiloxane having an average composition formula (1) described below:

$$R_a R^1_b SiO_{(4-a-b)/2} \quad (1)$$

wherein R is independently an alkenyl group, $R^1$ is independently an unsubstituted or substituted monovalent hydrocarbon group free of an aliphatic unsaturated bond, a is a positive number of 0.0001 to 0.2, b is a positive number of 1.7 to 2.2, and a+b is a positive number of 1.9 to 2.4,
the organopolysiloxane having at least one alkenyl group bonded to a silicon atom in one molecule;
(B) 20 to 200 parts by weight of an organopolysiloxane having an average composition formula (2) described below:

$$R^1_c SiO_{(4-c)/2} \quad (2)$$

wherein $R^1$ is equal to $R^1$ in component (A), and c is a positive number of 1.9 to 2.4;
(C) an organohydrogenpolysiloxane having an average composition formula (3) described below:

$$R^2_d H_e SiO_{(4-d-e)/2} \quad (3)$$

wherein $R^2$ is independently an unsubstituted or substituted monovalent hydrocarbon group free of an aliphatic unsaturated bond, d is a positive number of 0.7 to 2.2, e is a positive number of 0.001 to 1, and d+e is a positive number of 0.8 to 3,
the organohydrogenpolysiloxane having at least two hydrogen atoms each bonded to a silicon atom in one molecule, in such an amount that 0.01 to 3 hydrogen atoms are bonded to a silicon atom in component (C) per one alkenyl group bonded to a silicon atom in a whole of the self-adhesive silicone gel composition;
(D) an effective amount of a platinum group metal-based catalyst;
(E) 0.1 to 30 parts by weight of a partial hydrolytic condensate of a hydrolyzable silane having a general formula (4) described below:

$$Si(OR^3)_4 \quad (4)$$

wherein $R^3$ is independently an aliphatic monovalent hydrocarbon group having 1 to 10 carbon atoms,
the partial hydrolytic condensate as a whole having a residual ratio of the hydrolyzable silane having the general formula (4) of 1.0 mol % or less, the partial hydrolytic condensate included at a content of 99.0 mol % or more; and
(F) a metal carboxylate in an amount of 1 to 1,000 ppm based on a weight of the whole of the self-adhesive silicone gel composition, the metal carboxylate having a general formula (5) described below:

$$(R^4COO)_f M \quad (5)$$

wherein $R^4$ is an identical or nonidentical monovalent hydrocarbon group, M is a metal atom selected from cerium, iron, nickel, and niobium, f is 3 or 4 in a case where M is cerium or iron, 2 in a case where M is nickel, and 4 or 5 in a case where M is niobium,
the self-adhesive silicone gel composition free of a hydrolyzable silane other than component (E).
2.
The self-adhesive silicone gel composition according to the item 1, wherein in the general formula (4), $R^3$ is a methyl group, an ethyl group, or a propyl group.
3.
The self-adhesive silicone gel composition according to the item 1 or 2 that cures to give a silicone gel cured product having a penetration, defined in JIS K 2220, of 10 to 100.
4.
A silicone gel including a cured product of the self-adhesive silicone gel composition according to any one of the items 1 to 3.

Advantageous Effects of Invention

The self-adhesive silicone gel composition of the invention can give a silicone gel cured product that is excellent in heat resistance at high temperature, has a sufficient adhesive property even to a metal substrate including copper (Cu), aluminum (Al), or the like existing as a part of an electronic substrate, and is capable of suppressing occurrence of peeling and a void after adhesion and has high dielectric strength even under a high temperature condition.

BRIEF DESCRIPTION OF DRAWINGS

FIG. 1 is a graph showing the relationship between the amount of a free oil and the dielectric strength of a silicone gel cured product in Examples.

DESCRIPTION OF EMBODIMENTS

The self-adhesive silicone gel composition of the invention includes the following components (A) to (F) as essential components, and is free of a hydrolyzable silane other than the following component (E). In the invention, the term "silicone gel cured product (or silicone gel)" means a cured product that includes an organopolysiloxane as a principal component, has a low crosslinking density, and has a penetration, defined in JIS K 2220 (¼ cone), of 10 to 100. This cured product corresponds to a product that has a measured value in rubber hardness measurement in accordance with JIS K 6253 (rubber hardness value) of 0, has such a low hardness (that is, is so soft) that an effective rubber hardness value is not exhibited, and has a low stress. In this respect, this cured product is different from a so-called silicone rubber cured product (rubber-like elastic body).

Hereinafter, each component is described in detail. In the description, the viscosity is a value at 23° C.

[(A) Organopolysiloxane]

Component (A) is a main agent (base polymer) of the self-adhesive silicone gel composition of the invention. Component (A) is an organopolysiloxane having the following average composition formula (1) and having at least one alkenyl group bonded to a silicon atom (referred to as "silicon-bonded alkenyl group" in the description) in one molecule.

$$R_a R^1{}_b SiO_{(4-a-b)/2} \quad (1)$$

In the formula, R is independently an alkenyl group, $R^1$ is independently an unsubstituted or substituted monovalent hydrocarbon group free of an aliphatic unsaturated bond, a is a positive number of 0.0001 to 0.2, b is a positive number of 1.7 to 2.2, and a+b is a positive number of 1.9 to 2.4.

In the formula (1), R is independently an alkenyl group generally having 2 to 6 carbon atoms, preferably having 2 to 4 carbon atoms, and more preferably having 2 to 3 carbon atoms. Specific examples of the alkenyl group include a vinyl group, an allyl group, a propenyl group, an isopropenyl group, a butenyl group, and an isobutenyl group, and a vinyl group is preferable.

$R^1$ is independently an unsubstituted or substituted monovalent hydrocarbon group free of an aliphatic unsaturated bond such as an alkenyl group, and generally has 1 to 10 carbon atoms and preferably has 1 to 6 carbon atoms. Specific examples of the group include alkyl groups such as a methyl group, an ethyl group, a propyl group, an isopropyl group, a butyl group, an isobutyl group, a tert-butyl group, a pentyl group, a hexyl group, a cyclohexyl group, an octyl group, and a decyl group; aryl groups such as a phenyl group and a tolyl group; aralkyl groups such as a benzyl group and a phenylethyl group; and groups in which some or all of hydrogen atoms in the above-described groups are substituted with a halogen atom such as chlorine, bromine, or fluorine, such as a chloromethyl group and a 3,3,3-trifluoropropyl group. Among the groups, a methyl group, a phenyl group, and a 3,3,3-trifluoropropyl group are preferable because of ease of synthesis of these groups.

Furthermore, a is to be a positive number of 0.0001 to 0.2, and is preferably a positive number of 0.0005 to 0.1. b is to be a positive number of 1.7 to 2.2, and is preferably a positive number of 1.9 to 2.02. Here, a+b is a positive number of 1.9 to 2.4, and is preferably a positive number of 1.95 to 2.05.

Component (A) is to have at least one silicon-bonded alkenyl group in one molecule, and preferably has 2 to 50, and more preferably 2 to 10 silicon-bonded alkenyl groups. The values of a and b are to be selected so as to satisfy the condition of the silicon-bonded alkenyl group.

The molecular structure of the organopolysiloxane as component (A) is not particularly limited, and may be a linear structure or a branched structure including, for example, an $RSiO_{3/2}$ unit, an $R^1 SiO_{3/2}$ unit (R and $R^1$ are the same as described above), or an $SiO_{4/2}$ unit in a small amount. The organopolysiloxane preferably has a general formula (1a) described below:

[Chem. 1]

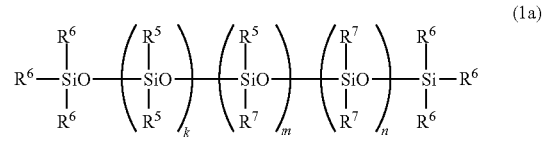

(1a)

wherein $R^5$ is independently an unsubstituted or substituted monovalent hydrocarbon group free of an aliphatic unsaturated bond such as an alkenyl group, $R^6$ is independently an unsubstituted or substituted monovalent hydrocarbon group free of an aliphatic unsaturated bond or $R^6$ is an alkenyl group, $R^7$ is an alkenyl group, provided that the one molecule includes at least 1, preferably 2 to 50, and more preferably 2 to 10 alkenyl groups, and in a case where the molecular chain has an alkenyl group as $R^6$ at either of the molecular chain ends, k is an integer of 40 to 1,200, m is an integer of 0 to 50, and n is an integer of 0 to 24, and in a case where the molecular chain does not have an alkenyl group as $R^6$ at both molecular chain ends, k is an integer of 40 to 1,200, m is an integer of 1 to 50, n is an integer of 0 to 24, and, m+n is 1 or more, that is, the organopolysiloxane is preferably a linear diorganopolysiloxane that has a main chain basically including repeating diorganosiloxane units and has molecular chain ends each blocked with a triorganosiloxy group.

In the formula (1a), the unsubstituted or substituted monovalent hydrocarbon group, represented by $R^5$, free of an aliphatic unsaturated bond such as an alkenyl group generally has 1 to 10 carbon atoms, and preferably has 1 to 6 carbon atoms. Specific examples of the group include the groups exemplified for $R^1$. Among the groups, a methyl group, a phenyl group, and a 3,3,3-trifluoropropyl group are preferable because of ease of synthesis of these groups.

When not an alkenyl group, the group represented by $R^6$ that is independently an unsubstituted or substituted monovalent hydrocarbon group free of an aliphatic unsaturated bond generally has 1 to 10 carbon atoms, and preferably has 1 to 6 carbon atoms. Specific examples of the group include the groups exemplified for $R^1$. Among the groups, a methyl group, a phenyl group, and a 3,3,3-trifluoropropyl group are preferable because of ease of synthesis of these groups. When $R^6$ is an alkenyl group, the alkenyl groups represented by $R^6$ and $R^7$ generally have 2 to 6 carbon atoms, preferably have 2 to 4 carbon atoms, and more preferably have 2 to 3 carbon atoms. Specific examples of the alkenyl groups include a vinyl group, an allyl group, a propenyl group, an isopropenyl group, a butenyl group, and an isobutenyl group, and a vinyl group is preferable.

In the formula (1a), in a case where the molecular chain has an alkenyl group as $R^6$ at either of the molecular chain ends, k is an integer of 40 to 1,200, m is an integer of 0 to 50, and n is an integer of 0 to 24, and it is preferable that k be an integer of 100 to 1,000, m be an integer of 0 to 40, and n be 0. In a case where the molecular chain does not have an alkenyl group as $R^6$ at both molecular chain ends, k is an integer of 40 to 1,200, m is an integer of 1 to 50, n is an integer of 0 to 24, and, m+n is 1 or more, and it is preferable that k be an integer of 100 to 1,000, m be an integer of 2 to 40, and n be 0.

Examples of the organopolysiloxane having the formula (1a) include a dimethylpolysiloxane having both ends each blocked with a dimethylvinylsiloxy group, a dimethylsiloxane/methylvinylsiloxane copolymer having both ends each blocked with a dimethylvinylsiloxy group, a dimethylsiloxane/diphenylsiloxane copolymer having both ends each blocked with a dimethylvinylsiloxy group, a dimethylsiloxane/methylvinylsiloxane/diphenylsiloxane copolymer having both ends each blocked with a dimethylvinylsiloxy group, a methyltrifluoropropylpolysiloxane having both ends each blocked with a dimethylvinylsiloxy group, a dimethylsiloxane/methyltrifluoropropylsiloxane copolymer having both ends each blocked with a dimethylvinylsiloxy group, a dimethylsiloxane/methyltrifluoropropylsiloxane/methylvinylsiloxane copolymer having both ends each blocked with a dimethylvinylsiloxy group, a dimethylsiloxane/vinylmethylsiloxane copolymer having both ends each blocked with a trimethylsiloxy group, a dimethylsiloxane/vinylmethylsiloxane/diphenylsiloxane copolymer having both ends each blocked with a trimethylsiloxy group, a vinylmethylsiloxane/methyltrifluoropropylsiloxane copolymer having both ends each blocked with a trimethylsiloxy group, a dimethylpolysiloxane having an end blocked with a trimethylsiloxy group and the other end blocked with a dimethylvinylsiloxy group, a dimethylsiloxane/methylvinylsiloxane copolymer having an end blocked with a trimethylsiloxy group and the other end blocked with a dimethylvinylsiloxy group, a dimethylsiloxane/diphenylsiloxane copolymer having an end blocked with a trimethylsiloxy group and the other end blocked with a dimethylvinylsiloxy group, a dimethylsiloxane/diphenylsiloxane/methylvinylsiloxane copolymer having an end blocked with a trimethylsiloxy group and the other end blocked with a dimethylvinylsiloxy group, a methyltrifluoropropylpolysiloxane having an end blocked with a trimethylsiloxy group and the other end blocked with a dimethylvinylsiloxy group, a dimethylsiloxane/methyltrifluoropropylsiloxane copolymer having an end blocked with a trimethylsiloxy group and the other end blocked with a dimethylvinylsiloxy group, a dimethylsiloxane/methyltrifluoropropylsiloxane/methylvinylsiloxane copolymer having an end blocked with a trimethylsiloxy group and the other end blocked with a dimethylvinylsiloxy group, a dimethylpolysiloxane having both ends each blocked with a methyldivinylsiloxy group, a dimethylsiloxane/methylvinylsiloxane copolymer having both ends each blocked with a methyldivinylsiloxy group, a dimethylsiloxane/diphenylsiloxane copolymer having both ends each blocked with a methyldivinylsiloxy group, a dimethylsiloxane/methylvinylsiloxane/diphenylsiloxane copolymer having both ends each blocked with a methyldivinylsiloxy group, a methyltrifluoropropylpolysiloxane having both ends each blocked with a methyldivinylsiloxy group, a dimethylsiloxane/methyltrifluoropropylsiloxane copolymer having both ends each blocked with a methyldivinylsiloxy group, a dimethylsiloxane/methyltrifluoropropylsiloxane/methylvinylsiloxane copolymer having both ends each blocked with a methyldivinylsiloxy group, a dimethylpolysiloxane having both ends each blocked with a trivinylsiloxy group, a dimethylsiloxane/methylvinylsiloxane copolymer having both ends each blocked with a trivinylsiloxy group, a dimethylsiloxane/diphenylsiloxane copolymer having both ends each blocked with a trivinylsiloxy group, a dimethylsiloxane/methylvinylsiloxane/diphenylsiloxane copolymer having both ends each blocked with a trivinylsiloxy group, a methyltrifluoropropylpolysiloxane having both ends each blocked with a trivinylsiloxy group, a dimethylsiloxane/methyltrifluoropropylsiloxane copolymer having both ends each blocked with a trivinylsiloxy group, and a dimethylsiloxane/methyltrifluoropropylsiloxane/methylvinylsiloxane copolymer having both ends each blocked with a trivinylsiloxy group.

The viscosity of the organopolysiloxane as component (A) is not particularly limited, but the viscosity at 23° C. is preferably 50 to 100,000 mPa·s, and more preferably 100 to 10,000 mPa·s from the viewpoint of improving the handling workability of the composition, the strength of the resulting cured product, and the fluidity. The viscosity can be measured with a rotational viscometer (the same applies below).

In the invention, the total number of repeating diorganosiloxane units included in the main chain of the organopolysiloxane (or the degree of polymerization) can be generally determined as, for example, the number average degree of polymerization (or numerical average molecular weight) as measured versus polystyrene standards in gel permeation chromatography (GPC) analysis using toluene or the like as a developing solvent (the same applies below).

The organopolysiloxane as component (A) may be used singly or in combination of two or more kinds thereof.

[(B) Organopolysiloxane]

Component (B) is a free oil included in the self-adhesive silicone gel composition of the invention, that is, a non-functional silicone oil component that is not engaged in crosslinking (curing reaction). Component (B) is a non-functional organopolysiloxane that has the following average composition formula (2) and is free of a reactive group (that is, an alkenyl group and an SiH group engaged in the curing reaction of the composition of the invention) at the molecular chain ends and in the non-end of the molecular chain (middle of the molecular chain).

$$R^1_c SiO_{(4-c)/2} \qquad (2)$$

In the formula, IV is the same as described above, and c is a positive number of 1.9 to 2.4.

In the formula (2), $R^1$ is independently an unsubstituted or substituted monovalent hydrocarbon group free of an aliphatic unsaturated bond, and generally has 1 to 10 carbon atoms and preferably has 1 to 6 carbon atoms. Specific examples of the group include alkyl groups such as a methyl group, an ethyl group, a propyl group, an isopropyl group, a butyl group, an isobutyl group, a tert-butyl group, a pentyl group, a hexyl group, a cyclohexyl group, an octyl group, and a decyl group; aryl groups such as a phenyl group and a tolyl group; aralkyl groups such as a benzyl group and a phenylethyl group; and groups in which some or all of hydrogen atoms in the above-described groups are substituted with a halogen atom such as chlorine, bromine, or fluorine, such as a chloromethyl group and a 3,3,3-trifluoropropyl group. Among the groups, a methyl group, a phenyl group, and a 3,3,3-trifluoropropyl group are preferable because of ease of synthesis of these groups.

c is a positive number of 1.9 to 2.4, and is preferably a positive number of 1.95 to 2.05.

The molecular structure of the non-functional organopolysiloxane as component (B) is not particularly limited, and may be a linear structure, a cyclic structure, or a branched structure including, for example, an $R^1Si_{3/2}$ unit ($R^1$ is the same as described above) or an $SiO_{4/2}$ unit in a small amount. However, the non-functional organopolysiloxane is preferably a linear diorganopolysiloxane having a main chain including a repeating diorganosiloxane unit of $R^1_2SiO_{1/2}$ and having molecular chain both ends each blocked with a triorganosiloxy group of $R^1_3SiO_{1/2}$.

The viscosity of the organopolysiloxane as component (B) is not particularly limited, but the viscosity at 23° C. is preferably 10 to 50,000 mPa·s, and more preferably 30 to 10,000 mPa·s from the viewpoint of improving the handling workability of the composition, the strength of the resulting cured product, and the fluidity.

From the same viewpoint, component (B) generally has a degree of polymerization (or a number of repeating diorganosiloxane units included in the main chain) of an integer of 10 to 1,200, preferably an integer of 30 to 1,000, and more preferably an integer of about 50 to 800.

The organopolysiloxane as component (B) may be used singly or in combination of two or more kinds thereof.

The addition amount of component (B) is 20 to 200 parts by weight, preferably 20 to 180 parts by weight, and more preferably 20 to 160 parts by weight per 100 parts by weight of component (A). If the addition amount of component (B) is less than 20 parts by weight, the amount of the free oil included in the silicone gel cured product is so small that the dielectric strength is low, and as a result, the reliability of the electronic component may deteriorate. If the addition amount of component (B) is more than 200 parts by weight, the obtained silicone gel composition may be not cured, component (B) to be a free oil may bleed out from the obtained silicone gel cured product to contaminate the electronic component, and a problem such as a decrease in the dielectric strength over time may occur.

[(C) Organohydrogenpolysiloxane]

Next, in component (C), at least two SiH groups in the molecule cause a hydrosilylation addition reaction with a silicon-bonded alkenyl group in component (A) described above to act as a crosslinking agent (curing agent) in the self-adhesive silicone gel composition of the invention.

Component (C) is an organohydrogenpolysiloxane having the following average composition formula (3):

$$R^2_d H_e SiO_{(4-d-e)/2} \quad (3)$$

wherein $R^2$ is independently an unsubstituted or substituted monovalent hydrocarbon group free of an aliphatic unsaturated bond, d is a positive number of 0.7 to 2.2, e is a positive number of 0.001 to 1, and d+e is a positive number of 0.8 to 3, and the organopolysiloxane has at least two hydrogen atoms each bonded to a silicon atom (SiH groups) in one molecule. The number of silicon-bonded hydrogen atoms (SiH groups) in one molecule of the organohydrogenpolysiloxane is preferably 2 to 500, more preferably 2 to 100, and particularly preferably 2 to 80.

In the formula (3), $R^2$ is independently an unsubstituted or substituted monovalent hydrocarbon group free of an aliphatic unsaturated bond, and generally has 1 to 10 carbon atoms and preferably has 1 to 6 carbon atoms. Specific examples of the group include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; and groups in which some or all of hydrogen atoms in the above-described groups are substituted with a halogen atom such as chlorine, bromine, or fluorine, such as a 3,3,3-trifluoropropyl group. Among the groups, alkyl groups, aryl groups, and a 3,3,3-trifluoropropyl group are preferable, and a methyl group, a phenyl group, and a 3,3,3-trifluoropropyl group are more preferable.

d is a positive number of 0.7 to 2.2, and is preferably a positive number of 1.0 to 2.1. e is a positive number of 0.001 to 1, preferably a positive number of 0.005 to 0.5, and more preferably a positive number of 0.015 to 0.1. d+e is a positive number of 0.8 to 3, preferably 1.0 to 2.5, and more preferably 1.5 to 2.2.

The number of silicon atoms in one molecule of the organohydrogenpolysiloxane as component (C) (that is, the degree of polymerization) is generally 10 to 1,000, but is preferably 20 to 500, and more preferably 20 to 100 from the viewpoint of improving the handling workability of the composition and the characteristics (low elastic modulus and low stress) of the obtained cured product.

The molecular structure of the organohydrogenpolysiloxane as component (C) is not particularly limited, and may be any of linear, cyclic, branched, and three-dimensional network structures, but the organohydrogenpolysiloxane is preferably linear.

Examples of the organohydrogenpolysiloxane having the formula (3) include 1,1,3,3-tetramethyldisiloxane, 1,3,5,7-tetramethylcyclotetrasiloxane, methylhydrogencyclopolysiloxane, tris(dimethylhydrogensiloxy)methylsilane, tris(dimethylhydrogensiloxy)phenylsilane, a methylhydrogensiloxane/dimethylsiloxane cyclic copolymer, a dimethylpolysiloxane having both ends each blocked with a dimethylhydrogensiloxy group, methylhydrogenpolysiloxane having both ends each blocked with a dimethylhydrogensiloxy group, a methylhydrogensiloxane/dimethylhydrogensiloxane copolymer having both ends each blocked with a dimethylhydrogensiloxy group, a methylhydrogensiloxane/diphenylsiloxane copolymer having both ends each blocked with a dimethylhydrogensiloxy group, a methylhydrogensiloxane/dimethylsiloxane/diphenylsiloxane copolymer having both ends each blocked with a dimethylhydrogensiloxy group, a methylhydrogenpolysiloxane having both ends each blocked with a trimethylsiloxy group, a dimethylsiloxane/methylhydrogensiloxane copolymer having both ends each blocked with a trimethylsiloxy group, a methylhydrogensiloxane/diphenylsiloxane copolymer having both ends each blocked with a trimethylsiloxy group, and a methylhydrogensiloxane/diphenylsiloxane/dimethylsiloxane copolymer having both ends each blocked with a trimethylsiloxy group.

The organohydrogenpolysiloxane as component (C) may be used singly or in combination of two or more kinds thereof.

The silicon-bonded hydrogen atom (SiH group) in the organohydrogenpolysiloxane as component (C) may be bonded to a silicon atom at the molecular chain end, bonded to a silicon atom in the non-end of the molecular chain (middle of the molecular chain), or bonded to silicon atoms at the molecular chain end and in the non-end of the molecular chain. However, from the viewpoint of, for example, the shear adhesive strength of the cured silicone gel, a combination is preferable of a bifunctional linear organohydrogenpolysiloxane having one SiH group each only at both molecular chain ends (that is, a diorganopolysiloxane having both ends each blocked with a diorganohydrogensiloxy group) and a polyfunctional linear organohydrogenpolysiloxane having an SiH group only in a part of the siloxane units in the non-end of the molecular chain (middle of the molecular chain) (that is, a diorganosiloxane/organohydrogensiloxane copolymer having both ends each blocked with a triorganosiloxy group). The polyfunctional linear organohydrogenpolysiloxane having an SiH group only in a part of the siloxane units in the non-end of the molecular chain (middle of the molecular chain) preferably has 3 to 500, more preferably 5 to 100, and most preferably 10 to 80 silicon-bonded hydrogen atoms (SiH groups) in one molecule. The content ratio ((diorganopolysiloxane having ends each blocked with a diorganohydrogensiloxy group)/(diorganosiloxane/organohydrogensiloxane copolymer having ends each blocked with a triorganosiloxy group)) in this case is preferably about 0.01 to 5.0, and more preferably about 0.1 to 3.0 as the ratio of ((number of moles of the SiH group in diorganopolysiloxane having ends each blocked with a diorganohydrogensiloxy group)/(number of moles of the SiH group in the diorganosiloxane/organohydrogensiloxane copolymer having ends each blocked with a triorganosiloxy group)).

The viscosity of the organohydrogenpolysiloxane as component (C) is not particularly limited, but the viscosity at 23° C. is preferably 1 to 1,000 mPa·s, and more preferably 5 to 500 mPa·s from the viewpoint of the handling workability of the composition and the like.

The addition amount of component (C) is such an amount that the number of hydrogen atoms each bonded to a silicon atom (SiH groups) in component (C) is 0.01 to 3, preferably 0.05 to 2, and more preferably 0.2 to 1.6 per one silicon-bonded alkenyl group in the whole of the composition (particularly, component (A)). If the number of hydrogen atoms each bonded to a silicon atom from component (C) is less than 0.01 per one alkenyl group in the whole of the composition, a cured product cannot be obtained. If the number is more than 3, the heat resistance of the cured product deteriorates.

[(D) Platinum Group Metal-Based Catalyst]

Component (D) of the invention is used as a catalyst for promotion of a hydrosilylation addition reaction between a silicon-bonded alkenyl group in component (A) described above and a silicon-bonded hydrogen atom in component (C) described above. Component (D) is a platinum group metal-based catalyst (platinum or a platinum-based compound), and a known component can be used. Specific examples of the platinum group metal-based catalyst include platinum black, chloroplatinic acid, and alcohol modified products of chloroplatinic acid, or the like; and complexes of chloroplatinic acid with an olefin, aldehyde, vinylsiloxane, acetylene alcohol, or the like.

The compounding amount of component (D) may be an effective amount, and can be appropriately increased or decreased according to a desired curing rate. The weight of component (D) in terms of a platinum atom is generally in the range of 0.1 to 1,000 ppm, and preferably 1 to 300 ppm based on the total weight of components (A) and (C). If the compounding amount is too large, the heat resistance of the obtained cured product may deteriorate.

[(E) Partial Hydrolytic Condensate of Hydrolyzable Silane]

Component (E) is a partial hydrolytic condensate of a hydrolyzable silane having the following general formula (4):

$$\mathrm{Si(OR^3)_4} \qquad (4)$$

wherein $R^3$ is independently an aliphatic monovalent hydrocarbon group having 1 to 10 carbon atoms. The partial hydrolytic condensate as a whole has a residual ratio of the hydrolyzable silane having the general formula (4) of 1.0 mol % or less and preferably 0.5 mol % or less, and the partial hydrolytic condensate is included at a content of 99.0 mol % or more and preferably 99.5 mol % or more. In the self-adhesive silicone gel composition of the invention, component (E) acts as a silane coupling agent that imparts an excellent adhesive property to various substrates even to a cured product of a composition (silicone gel) including a large amount of the non-functional organopolysiloxane (free oil) as component (B) described above, and is an essential component for suppression of softening degradation of the silicone gel cured product under a heat-resistant condition.

In the partial hydrolytic condensate of the hydrolyzable silane (E), an alcohol compound by-produced during hydrolysis may be contained (remain) in a minute amount of about 0.5% by weight or less based on the weight of the whole of component (E).

In the formula (4), $R^3$ is a monovalent aliphatic hydrocarbon group having 1 to 10 carbon atoms, and is preferably a linear or one-branched alkyl group, more preferably an alkyl group having 1 to 3 carbon atoms such as a methyl group, an ethyl group, or a propyl group, and particularly preferably a methyl group. $R^3$s may be the same or different.

Specific examples of the partial hydrolytic condensate of the hydrolyzable silane (silane coupling agent) include partial hydrolytic condensates of a tetraalkoxysilane such as tetramethoxysilane, tetraethoxysilane, tetrapropoxysilane, tetrabutoxysilane, tetrapentyl orthosilicate, tetraheptyl orthosilicate, or tetraoctyl orthosilicate. Among the partial hydrolytic condensates, a partial hydrolytic condensate of tetramethoxysilane, tetraethoxysilane, or tetrapropoxysilane is preferable, and a partial hydrolytic condensate of tetramethoxysilane is particularly preferable. In the invention, the term "partial hydrolytic condensate" means a hydrolyzable (organo)siloxane oligomer that is produced by partially hydrolyzing and condensing a hydrolyzable silane and has at least two, preferably three or more, remaining hydrolyzable groups in the molecule.

In the invention, in order to impart a sufficient adhesive property to a metal substrate including copper (Cu), aluminum (Al), or the like existing as a part of an electronic substrate, the partial hydrolytic condensate as component (E) as a whole is to have a residual ratio of the hydrolyzable silane (raw material) having the general formula (4) of 1.0 mol % or less and preferably 0.5 mol % or less, and the partial hydrolytic condensate is to be included at a content of 99.0 mol % or more and preferably 99.5 mol % or more. The reason is as follows. If the residual ratio of the hydrolyzable silane (raw material) having the general formula (4) is more than 1.0 mol %, expected adhesiveness cannot be obtained because the content of the partial hydrolytic condensate in the whole of component (E) is naturally reduced, and the dielectric strength deteriorates under a heat-resistant condition because a void is likely to be formed between the silicone gel cured product and the substrate. Furthermore, the influence on the human body is increased because the hydrolyzable silane is likely to volatilize.

The method of measuring the residual ratio of the hydrolyzable silane (raw material) in component (E) and the content of the partial hydrolytic condensate is preferably gas chromatography (GC) analysis.

The partial hydrolytic condensate of the hydrolyzable silane as component (E) preferably has a number average degree of polymerization of 2 to 50, and more preferably 2 to 30. Furthermore, the numerical average molecular weight is preferably 242 to 5,000, and more preferably 242 to 3,000.

As the partial hydrolytic condensate of the hydrolyzable silane as component (E), a commercially available product can be used, and it is possible to apply, for example, MKC silicate series such as MKC Silicate MS51 (manufactured by Mitsubishi Chemical, partial hydrolytic condensate of tetramethoxysilane, content of the partial hydrolytic condensate: 99.8 mol % or more, raw material tetramethoxysilane: 0.2 mol % or less).

The addition amount of the partial hydrolytic condensate of the hydrolyzable silane as component (E) is in the range of 0.1 to 30 parts by weight, preferably 0.5 to 10 parts by weight per 100 parts by weight of component (A). If the addition amount of component (E) is less than 0.1 parts by weight, an expected adhesive property to a substrate cannot be obtained. If the addition amount of component (E) is more than 30 parts by weight, the flexibility of the obtained silicone gel cured product is impaired, or the mechanical property deteriorates.

[(F) Metal Carboxylate]

Component (F) is represented by the following formula (5), is a metal carboxylate of a metal selected from cerium, iron, nickel, and niobium, and is an essential component for impartation of excellent heat resistance to the self-adhesive silicone gel composition of the invention.

$$(R^4COO)_f M \qquad (5)$$

In the formula, $R^4$ is an identical or nonidentical monovalent hydrocarbon group, M is a metal atom selected from cerium, iron, nickel, and niobium, f is 3 or 4 in a case where M is cerium or iron, 2 in a case where M is nickel, and 4 or 5 in a case where M is niobium.

In the formula (5), $R^4$ is an identical or nonidentical monovalent hydrocarbon group having preferably 1 to 20 and more preferably 1 to 18 carbon atoms, and specific examples of the group include alkyl groups such as a methyl group, an ethyl group, an n-propyl group, an isopropyl group, an n-butyl group, an isobutyl group, a tert-butyl group, a pentyl group, a hexyl group, a cyclohexyl group, a 1-ethylpentyl group, an octyl group, a 2-ethylhexyl group, a nonyl group, a decyl group, an undecyl group, a dodecyl group, a heptadecyl group, and an octadecyl group; alkenyl groups such as a vinyl group, an allyl group, a propenyl group, an octadecenyl group, and a (Z)-8-heptadecenyl group; aryl groups such as a phenyl group, a tolyl group, a xylyl group, and a naphthyl group; aralkyl groups such as a benzyl group, a phenylethyl group, and a phenylpropyl group; and groups in which some or all of hydrogen atoms in the above-described groups are substituted with a halogen atom such as chlorine, bromine, or fluorine, such as a chloromethyl group and a 3,3,3-trifluoropropyl group. Among the groups, a 1-ethylpentyl group, an octyl group, an octadecenyl group, an undecyl group, and a heptadecyl group are particularly preferable.

Specific examples of the metal carboxylate of a metal selected from any one of cerium, iron, nickel, or niobium include compounds (metal salts) of a carboxylic acid such as nonanoic acid, 2-ethylhexanoic acid, naphthenic acid, oleic acid, lauric acid, or stearic acid and a metal selected from cerium, iron, nickel, and niobium.

In the formula (5), the value of f is 3 or 4 in a case where M is cerium or iron, 2 in a case where M is nickel, and 4 or 5 in a case where M is niobium, and preferably 4.

The addition amount of component (F) of the invention is 1 to 1,000 ppm, preferably 50 to 800 ppm, and more preferably 90 to 550 ppm based on the weight of the whole of the composition. If the content of component (F) is less than 1 ppm, the effect of improving the heat resistance of the silicone gel cured product at high temperature is not observed, and if the content is more than 1,000 ppm, the insulation of the silicone gel cured product significantly deteriorates, or the curing property deteriorates.

[Another Optional Component]

In addition to components (A) to (F) described above, an optional component can be blended in the self-adhesive silicone gel composition of the invention as long as an object of the invention is not impaired. However, a hydrolyzable silane (an alkoxysilane, particularly tetraalkoxysilane) other than component (E) is not included. Examples of the optional component include reaction inhibitors, inorganic fillers, organopolysiloxanes free of a silicon-bonded hydrogen atom and a silicon-bonded alkenyl group (excluding components (B) and (E)), heat resistance imparting agents, flame retardancy imparting agents, thixotropy imparting agents, pigments, and dyes.

The reaction inhibitors are a component for suppression of the reaction of the composition, and specific examples of such a component include acetylene-based, amine-based, carboxylic acid ester-based, and phosphorous acid ester-based reaction inhibitors.

Examples of the inorganic fillers include inorganic fillers such as fumed silica, crystalline silica, precipitated silica, hollow fillers, silsesquioxane, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fibers; and fillers obtained by hydrophobizing the surface of the above-described fillers with an organosilicon compound such as an organoalkoxysilane compound, an organochlorosilane compound, an organosilazane compound, or a low molecular weight siloxane compound. Furthermore, silicone rubber powder, silicone resin powder, or the like may be blended.

[Curing of Composition]

The self-adhesive silicone gel composition of the invention can be prepared by uniformly mixing components (A) to (F) described above (in a case where an optional component is blended, the mixture includes also the optional component) in accordance with a conventional method. At this time, the components to be mixed may be divided into two or more parts and mixed if necessary. For example, the components to be mixed may be divided into a part including a part of component (A), a part of component (B), and components (D) and (F), and a part including the remaining part of component (A), the remaining part of component (B), and components (C) and (E), and mixed. When the uncured composition is stored at normal temperature, it is more preferable to divide the uncured composition into a part including a part of component (A), a part of component (B), and components (D) and (F), and a part including the remaining part of component (A), the remaining part of component (B), and components (C) and (E).

Then, the composition of the invention is cured at room temperature (23° C.±15° C.) or under a temperature condition according to the application, for example, at a temperature in the range of 60° C. to 150° C. for a curing time of about 10 minutes to 2 hours to obtain a silicone gel cured product.

The obtained cured product exhibits a good adhesive property particularly to a substrate of a metal such as copper or aluminum, and therefore the self-adhesive silicone gel composition of the invention is suitably used for sealing or filling an electrical or electronic part.

The cured product of the self-adhesive silicone gel composition of the invention (silicone gel) preferably has a penetration with a ¼ cone, defined in JIS K 2220, of 10 to 100, more preferably 15 to 90, and still more preferably 20 to 80. If the penetration is less than 10, the silicone gel is too hard. Therefore, a very large force is to be applied at the time of peeling, and the stress at the time of peeling is difficult to withstand. As a result, a part of the electronic circuit may be broken, or a crack may be generated inside the silicone gel cured product. If the penetration is more than 100, the silicone gel cured product is too soft. Therefore, when greatly deformed, the silicone gel cured product itself may be easily broken.

EXAMPLES

Hereinafter, the invention is specifically described with reference to Examples and Comparative Examples, but the invention is not limited to the following Examples. In Examples, the term "part" represents "part by weight", the term "%" represents "% by weight", and the term "Vi" represents a "vinyl group". The penetration is defined in JIS K 2220 as a penetration with a ¼ cone, and was measured using an automatic penetrometer RPM-101 manufactured by RIGO.

Example 1

After uniformly mixing and dispersing 100 parts of a dimethylsiloxane/diphenylsiloxane copolymer, having both molecular chain ends each blocked with a dimethylvinylsiloxy group, having a viscosity of 1,000 mPa·s at 23° C. and represented by the following formula (6), 100 parts of a dimethylsiloxane/diphenylsiloxane copolymer having both molecular chain ends each blocked with a trimethylsiloxy group (non-functional methylphenylsilicone oil) having a viscosity of 700 mPa·s at 23° C. and represented by the following formula (7), 0.70 parts of a dimethylsiloxane/methylhydrogensiloxane copolymer, having both molecular chain ends each blocked with a trimethylsiloxy group, having a viscosity of 100 mPa·s at 23° C. and represented by the following formula (8), 7.7 parts of dimethylpolysiloxane, having both molecular chain ends each blocked with a dimethylhydrogensiloxy group, having a viscosity of 18 mPa·s at 23° C. and represented by the following formula (9) (at this time, the number of silicon-bonded hydrogen atoms in component (B) per the number of silicon-bonded alkenyl groups in the composition (hereinafter, referred to as H/Vi) was 1.30), 0.10 parts of a dimethylpolysiloxane solution of a chloroplatinic acid-vinylsiloxane complex containing 1% of a platinum atom, 0.05 parts of ethynylcyclohexanol, and 0.10 parts (about 500 ppm in the composition) of iron 2-ethylhexanoate, 1.15 parts of MKC Silicate MS51 (a partial hydrolytic condensate of tetramethoxysilane, manufactured by Mitsubishi Chemical, content of the partial hydrolytic condensate: 99.8 mol % or more, tetramethoxysilane: 0.2 mol % or less) as component (E) was added and uniformly mixed to obtain composition 1.

[Chem. 2]

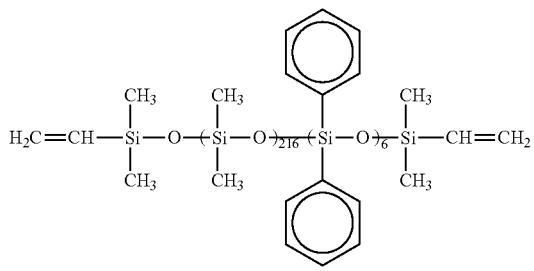
(6)

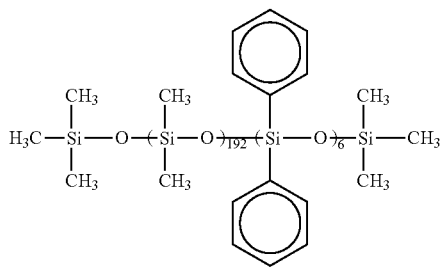
(7)

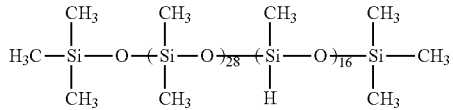
(8)

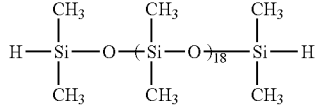
(9)

The obtained composition 1 was placed in a container (dimension: 30 mmφ×15 mm) and heated and cured at 80° C. for 60 minutes to obtain a silicone gel cured product having a penetration of 45.

Example 2

Composition 2 was obtained in the same manner as in Example 1, except that 0.02 parts (about 100 ppm in the composition) of niobium 2-ethylhexanoate was used instead of 0.10 parts of iron 2-ethylhexanoate in Example 1. Composition 2 was placed in a container (dimension: 30 mmφ× 15 mm) and heated and cured at 80° C. for 60 minutes to obtain a silicone gel cured product having a penetration of 50.

Example 3

Composition 3 was obtained in the same manner as in Example 1, except that 0.05 parts (about 250 ppm in the composition) of nickel 2-ethylhexanoate was used instead of 0.10 parts of iron 2-ethylhexanoate in Example 1. Composition 3 was placed in a container (dimension: 30 mmφ×15 mm) and heated and cured at 80° C. for 60 minutes to obtain a silicone gel cured product having a penetration of 47.

Example 4

Composition 4 was obtained in the same manner as in Example 1, except that 0.10 parts (about 500 ppm in the composition) of cerium 2-ethylhexanoate was used instead of 0.10 parts of iron 2-ethylhexanoate in Example 1. Composition 4 was placed in a container (dimension: 30 mmφ× 15 mm) and heated and cured at 80° C. for 60 minutes to obtain a silicone gel cured product having a penetration of 48.

Example 5

After uniformly mixing and dispersing 100 parts of a dimethylsiloxane/diphenylsiloxane copolymer, having both molecular chain ends each blocked with a dimethylvinylsiloxy group, having a viscosity of 1,000 mPa·s at 23° C. and represented by the formula (6), 20 parts of a dimethylsiloxane/diphenylsiloxane copolymer having both molecular chain ends each blocked with a trimethylsiloxy group (non-functional methylphenylsilicone oil) having a viscosity of 700 mPa·s at 23° C. and represented by the formula (7), 0.70 parts of a dimethylsiloxane/methylhydrogensiloxane copolymer, having both molecular chain ends each blocked with a trimethylsiloxy group, having a viscosity of 100 mPa·s at 23° C. and represented by the formula (8), 7.7 parts of dimethylpolysiloxane, having both molecular chain ends each blocked with a dimethylhydrogensiloxy group, having a viscosity of 18 mPa·s at 23° C. and represented by the formula (9) (at this time, the number of silicon-bonded hydrogen atoms in component (B) per the number of silicon-bonded alkenyl groups in the composition (H/Vi) was 1.30), 0.07 parts of a dimethylpolysiloxane solution of a chloroplatinic acid-vinylsiloxane complex containing 1% of a platinum atom, 0.04 parts of ethynylcyclohexanol, and 0.07 parts (about 500 ppm in the composition) of iron 2-ethylhexanoate, 0.65 parts of MKC Silicate MS51 (a partial hydrolytic condensate of tetramethoxysilane, manufactured by Mitsubishi Chemical, content of the partial hydrolytic condensate: 99.8 mol % or more, to tetramethoxysilane: 0.2 mol % or less) as component (E) was added and uniformly mixed to obtain composition 5.

The obtained composition 5 was placed in a container (dimension: 30 mmφ×15 mm) and heated and cured at 80° C. for 60 minutes to obtain a silicone gel cured product having a penetration of 46.

Example 6

After uniformly mixing and dispersing 100 parts of a dimethylsiloxane/diphenylsiloxane copolymer, having both molecular chain ends each blocked with a dimethylvinylsiloxy group, having a viscosity of 1,000 mPa·s at 23° C. and represented by the formula (6), 155 parts of a dimethylsiloxane/diphenylsiloxane copolymer having both molecular chain ends each blocked with a trimethylsiloxy group (non-functional methylphenylsilicone oil) having a viscosity of 700 mPa·s at 23° C. and represented by the formula (7), 1.20 parts of a dimethylsiloxane/methylhydrogensiloxane copolymer, having both molecular chain ends each blocked with a trimethylsiloxy group, having a viscosity of 100 mPa·s at 23° C. and represented by the formula (8), 7.8 parts of dimethylpolysiloxane, having both molecular chain ends each blocked with a dimethylhydrogensiloxy group, having a viscosity of 18 mPa·s at 23° C. and represented by the formula (9) (at this time, the number of silicon-bonded hydrogen atoms in component (B) per the number of silicon-bonded alkenyl groups in the composition (H/Vi) was 1.56), 0.07 parts of a dimethylpolysiloxane solution of a chloroplatinic acid-vinylsiloxane complex containing 1% of a platinum atom, 0.04 parts of ethynylcyclohexanol, and 0.07 parts (about 500 ppm in the composition) of iron 2-ethylhexanoate, 1.40 parts of MKC Silicate MS51 (a partial hydrolytic condensate of tetramethoxysilane, manufactured by Mitsubishi Chemical, content of the partial hydrolytic condensate: 99.8 mol % or more, tetramethoxysilane: 0.2 mol % or less) as component (E) was added and uniformly mixed to obtain composition 6.

The obtained composition 6 was placed in a container (dimension: 30 mmφ×15 mm) and heated and cured at 80° C. for 60 minutes to obtain a silicone gel cured product having a penetration of 50.

Comparative Example 1

Composition 7 was obtained in the same manner as in Example 1, except that MKC Silicate MS51 was not used in Example 1. Composition 7 was placed in a container (dimension: 30 mmφ×15 mm) and heated and cured at 80° C. for 60 minutes to obtain a silicone gel cured product having a penetration of 44.

Comparative Example 2

Composition 8 was obtained in the same manner as in Example 1, except that iron 2-ethylhexanoate was not used in Example 1. Composition 8 was placed in a container (dimension: 30 mmφ×15 mm) and heated and cured at 80° C. for 60 minutes to obtain a silicone gel cured product having a penetration of 45.

Comparative Example 3

After uniformly mixing and dispersing 100 parts of a dimethylsiloxane/diphenylsiloxane copolymer, having both molecular chain ends each blocked with a dimethylvinylsiloxy group, having a viscosity of 1,000 mPa·s at 23° C. and represented by the formula (6), 0.30 parts of a dimethylsiloxane/methylhydrogensiloxane copolymer, having both molecular chain ends each blocked with a trimethylsiloxy group, having a viscosity of 100 mPa·s at 23° C. and represented by the formula (8), 6.0 parts of dimethylpolysiloxane, having both molecular chain ends each blocked with a dimethylhydrogensiloxy group, having a viscosity of 18 mPa·s at 23° C. and represented by the formula (9) (at this time, the number of silicon-bonded hydrogen atoms in component (B) per the number of silicon-bonded alkenyl groups in the composition (hereinafter, referred to as H/Vi) was 0.89), 0.10 parts of a dimethylpolysiloxane solution of a chloroplatinic acid-vinylsiloxane complex containing 1% of a platinum atom, 0.05 parts of ethynylcyclohexanol, and 0.05 parts (about 500 ppm) of iron 2-ethylhexanoate, 1.10 parts of MKC Silicate MS51 (a partial hydrolytic condensate of tetramethoxysilane, manufactured by Mitsubishi Chemical, content of the partial hydrolytic condensate: 99.8 mol % or more, tetramethoxysilane: 0.2 mol % or less) as component (E) was added and uniformly mixed to obtain composition 9.

The obtained composition 9 was placed in a container (dimension: 30 mmφ×15 mm) and heated and cured at 80° C. for 60 minutes to obtain a silicone gel cured product having a penetration of 40.

Comparative Example 4

Composition 10 was obtained in the same manner as in Example 1, except that 1.15 parts of tetramethoxysilane was used instead of MKC Silicate MS51 in Example 1. Composition 10 was placed in a container (dimension: 30 mmφ× 15 mm) and heated and cured at 80° C. for 60 minutes to obtain a silicone gel cured product having a penetration of 44.

Comparative Example 5

Composition 11 was obtained in the same manner as in Example 1, except that 1.15 parts of a mixture of MKC Silicate MS51 and tetramethoxysilane at a weight ratio of 1:1 (having a purity of about 50%) was used instead of MKC Silicate MS51 in Example 1. Composition 11 was placed in a container (dimension: 30 mmφ×15 mm) and heated and cured at 80° C. for 60 minutes to obtain a silicone gel cured product having a penetration of 45.

[Evaluation Test]

Using the compositions and the cured products obtained in Examples 1 to 6 and Comparative Examples 1 to 5 described above, the following evaluation tests were performed. Table 1 shows the results.

Evaluation of adhesive property;

The composition obtained as described above was poured for preparation of a shear adhesion test specimen having an adhesion area of 2.5 mm$^2$ and an adhesion thickness of 2 mm using various adherends (oxygen-free copper and aluminum) having a width of 25 mm and a length of 100 mm, and heated and cured at 80° C. for 60 minutes. Then, measurement was performed with a method in accordance with JIS K 6249, the shear adhesive strength and the cohesive failure rate were confirmed, and the acceptance value of the cohesive failure rate was set to 80% or more.

Evaluation of heat resistance:

The cured product obtained in Examples and Comparative Examples described above was vertically placed and subjected to a heat resistance test at 250° C. for 100 hours, and the shape retaining property after the test and the penetration after the heat resistance test were measured. If the shape of a sample was not changed and no void was generated in the sample, the sample was determined to be acceptable, and if a sample was dropped from the container without retaining the shape of the sample, or if a void was generated in a sample, the sample was determined to be unacceptable. If a sample after the heat resistance test has a penetration of within ±15 of the numerical value of the initial penetration, the sample was determined to be acceptable, and if a sample after the heat resistance test has a penetration of more than +15 or less than −15 of the numerical value of the initial penetration, the sample was determined to be unacceptable.

Dielectric strength test:

A test was performed under the following conditions similar to those in Japanese Patent No. 6205824.
Measurement temperature: 25° C.
Cut-off current: 5 mA
Condition of increasing voltage: The voltage was increased from 2.0 kV AC by 0.2 kV every 10 seconds.

The voltage at the time of supplying a current under the above-described conditions was regarded as the dielectric strength.

Measurement of amount of free oil;

A silicone gel cured product was weighed on a cylindrical filter paper, and immersed in toluene for about 24 hours. Then, the toluene was removed, the resulting product was dried, and the change in the weight was measured. The ratio of the reduced weight to the weight before the immersion in toluene was calculated as a free oil content (amount of the free oil (% by weight)).

TABLE 1

| | | | | Example | | | | | |
|---|---|---|---|---|---|---|---|---|---|
| | | | | 1 | 2 | 3 | 4 | 5 | 6 |
| Compounding amount (part by weight) | (A) | Alkenyl group-containing organopolysiloxane (formula (6)) | | 100 | 100 | 100 | 100 | 100 | 100 |
| | (B) | Non-functional organopolysiloxane (formula (7)) | | 100 | 100 | 100 | 100 | 20 | 155 |
| | (C) | Organohydrogenpolysiloxane (formula (8)) | | 0.70 | 0.70 | 0.70 | 0.70 | 0.70 | 1.20 |
| | | Organohydrogenpolysiloxane (formula (9)) | | 7.7 | 7.7 | 7.7 | 7.7 | 7.7 | 7.8 |
| | (D) | Solution of chloroplatinic acid vinylsiloxane complex | | 0.10 | 0.10 | 0.10 | 0.10 | 0.07 | 0.07 |
| | (E) | Partial hydrolytic condensate of tetramethoxy silane | | 1.15 | 1.15 | 1.15 | 1.15 | 0.65 | 1.40 |
| | (E') | Tetramethoxysilane | | | | | | | |
| | | Mixture of partial hydrolytic condensate of tetramethoxysilane and tetramethoxysilane | | | | | | | |
| | (F) | Iron 2-ethylhexanoate | | 0.10 | | | | 0.07 | 0.07 |
| | | Niobium 2-ethylhexanoate | | | 0.02 | | | | |
| | | Nickel 2-ethylhexanoate | | | | 0.05 | | | |
| | | Cerium 2-ethylhexanoate | | | | | 0.10 | | |
| H/Vi | | | | 1.30 | 1.30 | 1.30 | 1.30 | 1.30 | 1.56 |
| Evaluation results | Penetration (1/4 cone) | | | 45 | 50 | 47 | 48 | 46 | 50 |
| | Adhesive property | Oxygen-free copper | Shear adhesive strength (kPa) | 80 | 75 | 77 | 85 | 150 | 60 |
| | | | Cohesive failure rate (%) | 100 | 100 | 100 | 100 | 100 | 90 |
| | | Aluminum | Shear adhesive strength (kPa) | 82 | 80 | 75 | 83 | 170 | 62 |
| | | | Cohesive failure rate (%) | 100 | 100 | 100 | 100 | 100 | 100 |

TABLE 1-continued

| | | | | | | | | |
|---|---|---|---|---|---|---|---|---|
| Heat resistance | After 250° C. × 100 hours | Shape retaining property | Flow or void is absent Acceptable | Flow or void is absent Acceptable | Flow or void is absent Acceptable | Flow or void is absent Acceptable | Flow or void is absent Acceptable | Flow or void is absent Acceptable |
| | | Penetration | 49 Acceptable | 55 Acceptable | 60 Acceptable | 50 Acceptable | 44 Acceptable | 58 Acceptable |
| Dielectric strength test (kV) | | | 7.1 | 7.0 | 7.2 | 6.5 | 6.2 | 7.4 |
| Amount of free oil (% by weight) | | | 50 | 52 | 55 | 53 | 41 | 66 |

| | | | | Comparative Example | | | | |
|---|---|---|---|---|---|---|---|---|
| | | | | 1 | 2 | 3 | 4 | 5 |
| Compounding amount (part by weight) | (A) | Alkenyl group-containing organopolysiloxane (formula (6)) | | 100 | 100 | 100 | 100 | 100 |
| | (B) | Non-functional organopolysiloxane (formula (7)) | | 100 | 100 | | 100 | 100 |
| | (C) | Organohydrogenpolysiloxane (formula (8)) | | 0.70 | 0.70 | 0.30 | 0.70 | 0.70 |
| | | Organohydrogenpolysiloxane (formula (9)) | | 7.7 | 7.7 | 6.0 | 7.7 | 7.7 |
| | (D) | Solution of chloroplatinic acid vinylsiloxane complex | | 0.10 | 0.10 | 0.10 | 0.10 | 0.10 |
| | (E) | Partial hydrolytic condensate of tetramethoxy silane | | | 1.15 | 1.10 | | |
| | (E') | Tetramethoxysilane | | | | | 1.15 | |
| | | Mixture of partial hydrolytic condensate of tetramethoxysilane and tetramethoxysilane | | | | | | 1.15 |
| | (F) | Iron 2-ethylhexanoate | | 0.10 | | 0.05 | 0.10 | 0.10 |
| | | Niobium 2-ethylhexanoate | | | | | | |
| | | Nickel 2-ethylhexanoate | | | | | | |
| | | Cerium 2-ethylhexanoate | | | | | | |
| H/Vi | | | | 1.30 | 1.30 | 0.89 | 1.30 | 1.30 |
| Evaluation results | Penetration (1/4 cone) | | | 44 | 45 | 40 | 44 | 45 |
| | Adhesive property | Oxygen-free copper | Shear adhesive strength (kPa) | 15 | 78 | 170 | 20 | 40 |
| | | | Cohesive failure rate (%) | 0 | 90 | 100 | 0 | 10 |
| | | Aluminum | Shear adhesive strength (kPa) | 30 | 85 | 160 | 45 | 60 |
| | | | Cohesive failure rate (%) | 20 | 100 | 100 | 50 | 50 |
| | Heat resistance | After 250° C. × 100 hours | Shape retaining property | Flow is present Unacceptable | Flow or void is absent Acceptable | Flow or void is absent Acceptable | Flow is present Unacceptable | Void is present Unacceptable |
| | | | Penetration | Unmeasurable Unacceptable | 9 Unacceptable | 20 Unacceptable | Unmeasurable Unacceptable | 65 Unacceptable |
| | Dielectric strength test (kV) | | | 7.0 | 7.1 | 5.8 | 7.0 | 6.8 |
| | Amount of free oil (% by weight) | | | 53 | 60 | 32 | 52 | 53 |

[Evaluation]

The composition in Examples 1 to 6 satisfies the requirements of the invention, and it can be seen that the composition can provide a silicone gel cured product that has good flexibility and a good adhesive property to copper and aluminum, retains its shape even under exposure in heat resistance at 250° C. in a vertical state, is free of a void, and has such flexibility that the initial penetration is almost the same even after 250° C.×100 hours.

It was also confirmed that the amount of the free oil and the dielectric strength of the silicone gel cured product in Examples showed a good correlation as shown in FIG. 1.

Meanwhile, the composition in Comparative Example 1 does not include component (E) of the invention, that is, does not satisfy a requirement for the content of the partial hydrolytic condensate of tetraalkoxysilane as an essential component of the invention, and it can be seen that the adhesiveness and the shape retaining property in heat resistance at 250° C. deteriorate. The composition in Comparative Example 2 does not include component (F) of the invention, that is, does not satisfy a requirement for the content of the carboxylate of cerium, iron, nickel, or niobium as an essential component of the invention, and it can be seen that the composition has a penetration of 9 after 250° C.×100 hours to cause hardening degradation. The composition in Comparative Example 3 does not include component (B) of the invention, that is, does not satisfy a requirement for the content of the organopolysiloxane free of a reactive group (non-functional silicone oil) as an essential component of the invention, and it can be seen that although the composition has good adhesiveness and a good shape retaining property, the composition has a penetration of 20 after 250° C.×100 hours to cause slight hardening degradation. Furthermore, from the fact that the electronic substrate including the silicone gel in Comparative Example 3 has the lowest dielectric strength of 5.8 kV, it can be seen that the compounding amount of component (B) affects the dielectric strength. Comparative Example 4 is a case of the composition in which tetraalkoxysilane as a monomer was used instead of the partial hydrolytic condensate of component (E) of the invention, and in this case, the adhesiveness and the shape retaining property deteriorated. This fact shows that use of the partial hydrolytic condensate of tetraalkoxysilane is effective. Comparative Example 5 shows the results in a case where the partial hydrolytic condensate of tetraalkoxysilane was included instead of component (E) at an intentionally reduced content, and an adhesive component having a high residual ratio of tetraalkoxysilane was prepared and added. Also in this case, the adhesiveness deteriorated. With regard to the heat resistance, it can be seen that the high residual ratio of tetraalkoxysilane leads to generation of a bubble called a void in the silicone gel cured product, resulting in deterioration of the heat resistance.

Summarizing the above-described results, it can be said that the cured product of the self-adhesive silicone gel composition (silicone gel) to which the essential components of the invention are added in a predetermined amount is a silicone gel that is excellent in the adhesive property to a metal substrate such as a copper or aluminum substrate and excellent in the heat resistance (shape retaining property and flexibility retention), and has high dielectric strength.

INDUSTRIAL APPLICABILITY

The silicone gel cured product obtained by curing the self-adhesive silicone gel composition of the invention is excellent in the adhesive property to a metal substrate such as a copper or aluminum substrate, and therefore the silicone gel cured product is effective for application of protection of an electronic component such as an integrated circuit (IC) or hybrid IC, and a silicone gel cured product can be obtained in which a flow or a void is not generated even under exposure to a high-temperature atmosphere in a state of vertical placement. Therefore, space saving and improvement in the long-term durability in the electronic device are expected.

The invention claimed is:
1. A self-adhesive silicone gel composition comprising:
(A) 100 parts by weight of an organopolysiloxane having an average composition formula (1) described below:

$$R_a R^1_b SiO_{(4-a-b)/2} \quad (1)$$

wherein R is independently an alkenyl group, $R^1$ is independently an unsubstituted or substituted monovalent hydrocarbon group free of an aliphatic unsaturated bond, a is a positive number of 0.0001 to 0.2, b is a positive number of 1.7 to 2.2, and a+b is a positive number of 1.9 to 2.4,
the organopolysiloxane having at least one alkenyl group bonded to a silicon atom in one molecule;
(B) 20 to 200 parts by weight of an organopolysiloxane having an average composition formula (2) described below:

$$R^1_c SiO_{(4-c)/2} \quad (2)$$

wherein $R^1$ is equal to $R^1$ in component (A), and c is a positive number of 1.9 to 2.4;
(C) an organohydrogenpolysiloxane having an average composition formula (3) described below:

$$R^2_d H_e SiO_{(4-d-e)/2} \quad (3)$$

wherein $R^2$ is independently an unsubstituted or substituted monovalent hydrocarbon group free of an aliphatic unsaturated bond, d is a positive number of 0.7 to 2.2, e is a positive number of 0.001 to 1, and d+e is a positive number of 0.8 to 3,
the organohydrogenpolysiloxane having at least two hydrogen atoms each bonded to a silicon atom in one molecule, in such an amount that 0.01 to 3 hydrogen atoms are bonded to a silicon atom in component (C) per one alkenyl group bonded to a silicon atom in a whole of the self-adhesive silicone gel composition;
(D) an effective amount of a platinum group metal-based catalyst;
(E) 0.1 to 30 parts by weight of a partial hydrolytic condensate of a hydrolyzable silane having a general formula (4) described below:

$$Si(OR^3)_4 \quad (4)$$

wherein $R^3$ is independently an aliphatic monovalent hydrocarbon group having 1 to 10 carbon atoms,
the partial hydrolytic condensate as a whole having a residual ratio of the hydrolyzable silane having the general formula (4) of 1.0 mol % or less, the partial hydrolytic condensate included at a content of 99.0 mol % or more; and
(F) a metal carboxylate in an amount of 1 to 1,000 ppm based on a weight of the whole of the self-adhesive silicone gel composition, the metal carboxylate having a general formula (5) described below:

$$(R^4 COO)_f M \quad (5)$$

wherein $R^4$ is an identical or nonidentical monovalent hydrocarbon group, M is a metal atom selected from cerium, iron, nickel, and niobium, f is 3 or 4 in a case where M is cerium or iron, 2 in a case where M is nickel, and 4 or 5 in a case where M is niobium,
the self-adhesive silicone gel composition free of a hydrolyzable silane other than component (E).
2. The self-adhesive silicone gel composition according to claim 1, wherein in the general formula (4), $R^3$ is a methyl group, an ethyl group, or a propyl group.
3. The self-adhesive silicone gel composition according to claim 1 that cures to give a silicone gel cured product having a penetration, defined in JIS K 2220, of 10 to 100.
4. A silicone gel comprising a cured product of the self-adhesive silicone gel composition according to claim 1.

* * * * *